2,799,698

OXIDATION OF ALKYL-SUBSTITUTED AROMATIC COMPOUNDS TO PHENOLIC COMPOUNDS

Milton A. Taves, Wilmington, Del., assignor to Hercules Powder Company, Wilmington, Del., a corporation of Delaware No Drawing. Application December 30, 1954, Serial No. 478,930

13 Claims. (Cl. 260—479)

This invention relates to oxidation of organic compounds.

The oxidation of aromatic organic compounds to hydroperoxides and the subsequent cleavage of the hydroperoxides whereby phenolic compounds are produced are well known in the art. In the step of oxidation, alkaline materials are generally present to stabilize the hydroperoxides, since the premature cleavage of even a small portion of the hydroperoxide to a phenolic compound will inhibit further oxidation. In the oxidation of polyisopropylbenzenes to polyhydroperoxides the difficulty of premature cleavage in the course of the oxidation step has been particularly important because of the high conversion required to produce even small yields of the polyhydroperoxide. Moreover, the prior art oxidation process has been limited to the oxidation of compounds free of phenol and amino groups.

Now, in accordance with the present invention, it has been found that organic compounds containing an aromatic ring having at least one secondary hydrocarbon radical attached thereto are oxidized to organic compounds wherein at least one secondary hydrocarbon radical is converted into an acyloxy radical attached to said ring by contacting said organic compounds with elementary oxygen at a temperature in the range of about 30° C. to about 150° C. in the presence of an anhydride of an organic acid, acyl-O-acyl.

The process of this invention is believed to comprise a combination of steps in which a hydroperoxide, which is formed initially, is esterified by the acid anhydride, and the resulting peroxy ester is subsequently cleaved to the phenolic ester with elimination of acetone. The reaction is also catalyzed by acid-acting catalysts which, when used, may change the mechanism of the reaction to one in which the hydroperoxide is cleaved to a phenol and the latter is finally esterified by the anhydride.

In carrying out the process of this invention the oxidizable organic compound is dissolved in sufficient organic acid anhydride to esterify any esterifiable group in the oxidizable organic compound as well as the anticipated phenol groups to be formed, and an oxygen-containing gas is added to the mixture at a temperature of about 30–150° C., suitably about 90° C., with vigorous agitation until a substantial amount of phenolic ester is produced.

By the present process cumene is oxidized to an ester of phenol, m-diisopropylbenzene is oxidized to resorcinol ester, p-diisopropylbenzene is oxidized to hydroquinone ester, 1,3,5-triisopropylbenzene is oxidized to phloroglucinol ester, m-isopropylphenol is oxidized to resorcinol ester, p-isopropylphenol is oxidized to hydroquinone ester, and 5-isopropylresorcinol is oxidized to phloroglucinol ester. Moreover, the process is not limited to benzene derivatives but is applicable to the broad class of aromatic organic compounds in which an oxidizable secondary hydrocarbon radical is attached to the aromatic ring. Furthermore, the aromatic organic compound may contain other substituents such as $-NH_2$, $-OH$, $-NR_2$, $-NHR$, $-OR$, Cl, Br, $NO_2$, $-OCOR$, $-CO-$, $-SO_2H$, where R is an aliphatic radical. While many of these substituents inhibit oxidation in prior art oxidation processes, they do not prevent the process of the present invention.

The process is exemplified by the following examples in which all percentages and amounts are expressed by weight units. These examples are exemplary only and are not to be construed as limiting.

Example 1

A mixture of 60 parts p-isopropylphenyl acetate and 12 parts acetic anhydride was heated to 100° C. and contacted with a dispersion of oxygen which was passed into the reaction mixture at the rate of about 0.022 part molecules per minute while radiating the mixture with ultraviolet light. After 95 hours the acetone, acetic acid, acetic anhydride, and most of the unreacted isopropylphenyl acetate were distilled off at 12 mm. pressure. The residue was crystalline. The crystals were filtered out, washed with ethanol, and then recrystallized from ethanol to recover hydroquinone diacetate which melted at 125.5–126.6° C. The total yield of crude crystals amounted to about 5.4 parts.

Example 2

Oxygen was bubbled through a stirred mixture of 120 parts of cumene, 306 parts of acetic anhydride, and 4.25 parts of p-toluenesulfonic acid maintained at 90° C. After 118 hours, the acetic acid, acetic anhydride, and unreacted cumene were fractionally distilled from the mixture to a final head temperature of 46° C./19 mm. and pot temperature of 90° C. From the distillate 75.2 parts of cumene was recovered by washing acetic acid and anhydride out with water. The p-toluenesulfonic acid was removed from the residue by extraction of its ether solution with aqueous sodium bicarbonate. Fractional distillation gave a cut, B. P. 75–89° C./16–17 mm. which amounted to 32.8 parts. The liquid was identified by infrared analysis as phenyl acetate and assayed 97% based on saponification number. This indicates a yield of 61% at 37% of the cumene reacted.

Example 3

Oxygen was bubbled through a stirred mixture of 130 parts of p-diisopropylbenzene, 327 parts of acetic anhydride, and 3.4 parts of p-toluenesulfonic acid maintained at a temperature of 90° C. After 165 hours, the acetic acid and acetic anhydride were fractionally distilled from the mixture to a final head temperature of 44° C./16 mm. and pot temperature of 90° C. The p-toluenesulfonic acid was removed from the residue by extraction of its ether solution with aqueous sodium bicarbonate. Fractional distillation gave 50 parts of recovered p-diisopropylbenzene, B. P. 85–100° C./16 mm., and 40 parts of p-isopropylphenyl acetate, B. P. 115–119.5° C./16 mm. The latter cut assayed 100% based on saponification number. This indicates a yield of 46% at 62% of the p-diisopropylbenzene reacted. Chromatographic separation of the pot residue on silica gel showed that the residue contained both p-isopropylphenyl acetate and hydroquinone diacetate. The latter was isolated (6.25 parts) and identified by a mixed melting point with an authentic sample of hydroquinone diacetate.

Example 4

Oxygen was bubbled through a stirred mixture of 134 parts of p-cymene, 306 parts of acetic anhydride, and 4.4 parts of p-toluenesulfonic acid maintained at 90° C. After 60 hours, the acetic acid, acetic anhydride, and p-cymene were fractionally distilled from the reaction mixture. The p-cymene cut, B. P. 57–65° C./17 mm., amounted to 48.6 parts. The final pot temperature was 100° C. The p-toluenesulfonic acid was removed from the residue by extraction with aqueous sodium bicarbonate. Fractional distillation then gave an additional 6.3 parts of p-cymene, B. P. 62.5–65° C./16 mm., and 18.8 parts of p-cresyl acetate, B. P. 99–104° C./16 mm. The latter cut assayed 89% based on saponification number. This indicates a yield of 19% at 59% of the p-cymene reacted.

*Example 5*

Oxygen was bubbled through a mixture of 40 parts of p-isopropylacetanilide, 80 parts of acetic anhydride, and 1.0 part of p-toluenesulfonic acid maintained at 90° C. After 96 hours, the acetic acid and acetic anhydride were fractionally distilled from the reaction mixture to a final head temperature of 45° C./16 mm. and a pot temperature of 90° C. The ether solution of the residue was extracted with aqueous sodium bicarbonate to remove p-toluenesulfonic acid. After evaporating the ether, the residue was refluxed with 10% aqueous sodium hydroxide to hydrolyze the acetates. The mixture was extracted with ether. The residue from the ether solution was chromatographed with Florex from which was obtained 15.5 parts of p-isopropylaniline. The alkaline aqueous solution was neutralized with hydrochloric acid whereupon 7.9 parts of crude p-aminophenol precipitated. After recrystallization from alcohol, this material melted at 184° C. with decomposition. A yield of 65% was obtained at 49% reacted.

*Example 6*

Oxygen was bubbled through a mixture of 40 parts of p-isopropylanisole, 80 parts of acetic anhydride, and 1.0 part of p-toluenesulfonic acid maintained at 90° C. After 120 hours, the acetic acid and acetic anhydride were fractionally distilled from the mixture to a final head temperature of 44° C./16 mm. and a pot temperature of 90° C. The ether solution of the residue was extracted with aqueous sodium bicarbonate to remove p-toluenesulfonic acid. Chromatographic adsorption on silica gel then gave 22 parts of p-isopropylanisole, B. P. 88–96° C./16 mm. and 12.7 parts of p-methoxyphenyl acetate, B. P. 120–132° C./16 mm. The latter cut assayed 94% based on saponification number. This indicates 60% yield at 45% of the p-isopropylanisole reacted.

*Example 7*

Oxygen was bubbled through a stirred mixture of 240 parts 1,3,5-triisopropylbenzene, 500 parts acetic anhydride, and 4 parts p-toluenesulfonic acid while maintaining a temperature of 90° C. After 500 hours, the acetic acid formed in the reaction and unreacted acetic anhydride were distilled off. The residue was taken up in ether, washed with aqueous sodium bicarbonate, and chromatographed on silica gel. From the silica gel was recovered isopropylresorcinol diacetate and phloroglucinol triacetate.

The organic compounds which undergo the oxidation in accordance with this invention are further exemplified by the following: cumene, cymene, m- and p-diisopropylbenzene, 1,3,5-triisopropylbenzene, sec-butylbenzene, di-sec-butylbenzene, tri-sec-butylbenzene, diisopropyltoluene, di-sec-butlytoluene, cyclohexylbenzene, cyclohexylcumene, cyclohexyltoluene, isopropylphenol, isopropylaniline, isopropylanisole, isopropylphenyl acetate, isopropylchlorophenol, isopropylnitrophenol, isopropylnaphthalene, diisopropylnaphthalene, isopropylnaphthol, and isopropylnaphthylamine. In general, the aromatic ring in the oxidizable organic compounds is any aromatic radical such as phenyl, naphthyl, anthryl, phenanthryl, and the like which may be unsubstituted rings or rings substituted with lower alkyl groups, phenolic hydroxyl groups, phenolic ether groups, chloro groups, carboxyl groups, acyl groups, nitro groups, amino groups, alkylamino groups, acylamino groups, and the like. The secondary hydrocarbon radical attached to the aromatic ring which is replaced by the acyloxy group in the oxidation process is a radical having one hydrogen on the α-carbon attached to the ring. Such a radical includes the following α-carbon grouping

which is the grouping of a secondary hydrocarbon radical. The secondary hydrocarbon radical which fulfills this requirement includes such radicals as isopropyl, sec-butyl, cyclopentyl, and cyclohexyl which are preferred because of their low molecular weight. However, higher molecular weight radicals up to about 7 carbon atoms are also operable.

The anhydride of an organic acid used in the present process may be any anhydride which combines with phenol under the conditions of the reaction. Anhydrides which may be used include: acetic, propionic, butyric, chlorocetic, isobutyric, maleic, malic, benzoic, and the like. Acetic anhydride is preferred. The amount of anhydride used must be at least sufficient to combine with all phenol groups produced in the reaction in addition to an amount sufficient to combine with any reactive functional groups in the organic compound subjected to the reaction. Thus a chemical excess of the anhydride must be provided when the organic compound subjected to the oxidation is a phenol or an amine.

When a solvent is desired or is necessary for carrying out the reaction because of the solid or viscous nature of the anhydride or of the material oxidized or produced, the solvent used may be a liquid reagent, a liquid organic carboxylic acid, or an organic solvent which does not oxidize or esterify under the reaction conditions. Thus the liquid anhydrides, such as acetic anhydride, provide a satisfactory solvent. The organic acid corresponding to the anhydride may also be used as a solvent when a solvent is desired.

The temperature of reaction is any temperature from about 30° C. to about 150° C. The preferred temperature is 70–120° C.

The elementary oxygen used in the oxidation may be concentrated oxygen, air, or air fortified with oxygen. The reaction may be carried out with recirculation of the oxygen-containing gas pressure may be used to avoid loss of materials.

The acid-acting catalysts which are preferably used in the process of this invention are any of the well known acidic catalysts used for esterification such as hydrogen chloride, hydrogen bromide, phosphoric acid, sulfuric acid, p-toluenesulfonic acid, benzenesulfonic acid, acidic clays such as montmorillonite, halloysite, attapulgite, vermiculite, acid-treated bentonite and kaolinite, fuller's earth, activated silica, zinc chloride, sodium acid sulfate, and the like.

The mechanical process of contacting the organic compound to be oxidized with the elementary oxygen is substantially the same as is well known in the art of oxidizing cumene with elementary oxygen for the production of cumene hydroperoxide, the elementary oxygen being added in conjunction with a dispersing device with rapid agitation to facilitate good contacting.

In carrying out the process of this invention it is advantageous, where possible, to distill off the acid produced from the anhydride as well as the acetone during the oxidation.

The products of this invention are esters of the acid of the anhydride used in the process and the phenolic material produced. Such products result from the conversion of the secondary hydrocarbon group on the aromatic ring to an acyloxy group in the position formerly occupied by the secondary hydrocarbon group. The products include the esters of: phenol, isopropylphenol, cresols, hydroquinone, isopropylhydroquinone, resorcinal, isopropylresorcinol, methylresorcinol, phloroglucinol, m-aminophenol, p-aminophenol, m-chlorophenol, p-chlorophenol, m-nitrophenol, p-nitrophenol, m-methoxyphenol, p-methoxyphenol, isopropylaminophenol, isopropylchlorophenol, isopropylnitrophenol, diaminophenols, dichlorophenols, dinitrophenols, and dimethoxyphenols, and corresponding products having naphthalene, anthracene, and phenanthrene rings in the molecule produced by conversion of the secondary hydrocarbon group of the appropriate starting material to the acyloxy compound.

The esters are recovered from the acid reaction medium by distillation of the organic acids therefrom, by dilution with water to destroy excess anhydrides followed by distillation of the acids, or by dilution with sufficient water to cause the ester to separate. The ester is then purified by water-washing, distillation, or crystallization, or it is saponified by heating with alcoholic sodium hydroxide followed by acidification to precipitate the phenolic product.

The process of this invention followed by saponification provides an excellent means for producing monohydric or polyhydric phenols in high yields.

What I claim and desire to protect by Letters Patent is:

1. The method of oxidizing an organic compound containing an aromatic ring having at least one secondary hydrocarbon radical of not more than 7 carbon atoms attached thereto whereby at least one secondary hydrocarbon radical is converted to an acyloxy radical attached to said ring, which comprises contacting said organic compound with elementary oxygen at a temperature in the range of about 30° C. to about 150° C. in the presence of a lower alkanoic acid anhydride.

2. The method of oxidizing an organic compound containing an aromatic ring having at least one secondary hydrocarbon radical of not more than 7 carbon atoms attached thereto whereby at least one secondary hydrocarbon radical is converted to an acetoxy radical attached to said ring, which comprises contacting said organic compound with elementary oxygen at a temperature in the range of about 30° C. to about 150° C. in the presence of acetic anhydride.

3. The method of oxidizing an organic compound containing a benzene ring having at least one secondary hydrocarbon radical of not more than 7 carbon atoms attached thereto whereby at least one secondary hydrocarbon radical is converted to an acyloxy radical attached to said ring, which comprises contacting said organic compound with elementary oxygen at a temperature in the range of about 30° C. to about 150° C. in the presence of a lower alkanoic acid anhydride.

4. The method of oxidizing an organic compound containing a naphthalene ring having at least one secondary hydrocarbon radical of not more than 7 carbon atoms attached thereto whereby at least one secondary hydrocarbon radical is converted to an acyloxy radical attached to said ring, which comprises contacting said organic compound with elementary oxygen at a temperature in the range of about 30° C. to about 150° C. in the presence of a lower alkanoic acid anhydride.

5. The method of oxidizing an organic compound containing a phenanthrene ring having at least one secondary hydrocarbon radical of not more than 7 carbon atoms attached thereto whereby at least one secondary hydrocarbon radical is converted to an acyloxy radical attached to said ring, which comprises contacting said organic compound with elementary oxygen at a temperature in the range of about 30° C. to about 150° C. in the presence of a lower alkanoic acid anhydride.

6. The method of oxidizing an organic compound containing an anthracene ring having at least one secondary hydrocarbon radical of not more than 7 carbon atoms attached thereto whereby at least one secondary hydrocarbon radical is converted to an acyloxy radical attached to said ring, which comprises contacting said organic compound with elementary oxygen at a temperature in the range of about 30° C. to about 150° C. in the presence of a lower alkanoic acid anhydride.

7. The method of oxidizing a diisopropylbenzene to a benzenediol diacetate which comprises contacting said diisopropylbenzene with elementary oxygen at a temperature in the range of about 30° C. to about 150° C. in the presence of acetic anhydride.

8. The method of oxidizing p-diisopropylbenzene to hydroquinone diacetate which comprises contacting said p-diisopropylbenzene with elementary oxygen at a temperature in the range of about 30° C. to about 150° C. in the presence of acetic anhydride.

9. The method of oxidizing 1,3,5-triisopropylbenzene to phloroglucinol triacetate which comprises contacting said 1,3,5-triisopropylbenzene with elementary oxygen at a temperature in the range of about 30° C. to about 150° C. in the presence of acetic anhydride.

10. The method of oxidizing an organic compound containing a benzene ring having at least one secondary hydrocarbon radical of not more than 7 carbon atoms attached thereto whereby at least one secondary hydrocarbon radical is converted to an acetoxy radical attached to said ring which comprises contacting said organic compound with elementary oxygen at a temperature in the range of about 30° C. to about 150° C. in the presence of acetic anhydride.

11. The method of oxidizing an isopropylphenyl acetate to a benzenediol diacetate which comprises contacting said isopropylphenyl acetate with elementary oxygen at a temperature in the range of about 30° C. to about 150° C. in the presence of acetic anhydride.

12. The method of oxidizing p-isopropylphenyl acetate to hydroquinone diacetate which comprises contacting said p-isopropylphenyl acetate with elementary oxygen at a temperature in the range of about 30° C. to about 150° C. in the presence of acetic anhydride.

13. The method of oxidizing 5-isopropylresorcinol diacetate to phloroglucinol triacetate which comprises contacting said 5-isopropylresorcinol diacetate with elementary oxygen at a temperature in the range of about 30° C. to about 150° C. in the presence of acetic anhydride.

References Cited in the file of this patent

UNITED STATES PATENTS

| | | |
|---|---|---|
| 2,663,743 | Bewley et al. | Dec. 22, 1953 |
| 2,697,121 | Mosnier et al. | Dec. 14, 1954 |

OTHER REFERENCES

Barnett et al.: Ind. Eng. Chem. 41 (1949).
Wagner et al.: "Synthetic Organic Chemistry" (1953).